US012778350B2

(12) United States Patent
Throckmorton et al.

(10) Patent No.: US 12,778,350 B2
(45) Date of Patent: Nov. 3, 2026

(54) BLENDER ENCLOSURE

(71) Applicant: BLENDTEC, INC., Orem, UT (US)

(72) Inventors: David J. Throckmorton, Mapleton, UT (US); Steven K. Atkinson, Lehi, UT (US); Calvin Cox, Eagle Mountain, UT (US); Sam D. Olds, Provo, UT (US)

(73) Assignee: BlendTec, Inc., Orem, UT (US)

( * ) Notice: Subject to any disclaimer, the term of this patent is extended or adjusted under 35 U.S.C. 154(b) by 290 days.

(21) Appl. No.: 18/150,706

(22) Filed: Jan. 5, 2023

(65) Prior Publication Data

US 2024/0225361 A1 Jul. 11, 2024

(51) Int. Cl.
*A47J 43/07* (2006.01)

(52) U.S. Cl.
CPC .................................. *A47J 43/0772* (2013.01)

(58) Field of Classification Search
CPC .... A47J 43/0722; A47J 43/046; A47J 43/085; A47J 43/0716; A47J 43/075; A47J 43/0761; A47J 43/0777
See application file for complete search history.

(56) References Cited

U.S. PATENT DOCUMENTS 4,561,782 A * 12/1985 Jacobsen ................. B01F 27/85 366/205
7,040,799 B2 5/2006 Pryor, Jr.
10,357,131 B2 7/2019 Dickson et al.
2010/0038462 A1* 2/2010 Kolar .................... A47J 43/046 241/285.3
2012/0294108 A1* 11/2012 Dickson, Jr. .......... B01F 27/808 366/205
2014/0217211 A1* 8/2014 Sanford .............. A47J 43/0761 241/37.5
2022/0142409 A1* 5/2022 Beckstrom .......... A47J 43/0722
(Continued)

FOREIGN PATENT DOCUMENTS

CN 101199393 A * 6/2008 .............. B01F 31/42
RU 2340271 C2 * 12/2008 ............... A23N 1/02

OTHER PUBLICATIONS

RU 2340271 C2 English Espacenet Translation (Year: 2008).*
(Continued)

*Primary Examiner* — Christopher L Templeton
*Assistant Examiner* — P Derek Pressley
(74) *Attorney, Agent, or Firm* — DORSEY & WHITNEY LLP

(57) ABSTRACT

A blending apparatus can include: a blender jar defining a blending cavity; a lid positionable over the blender jar, the lid defining an opening into the blending cavity; a gasket positioned around a periphery of the opening in the lid; an enclosable sound dampener positionable around the blender jar and the lid, the enclosable sound dampener defining an access hole corresponding to the opening in the lid; and a tamper insertable through the access hole and the opening. In particular examples, when the tamper is inserted through the access hole and the enclosable sound dampener is in a closed state, blending noise is at least partially contained within the enclosable sound dampener. Further, in some examples, when the tamper is inserted through the opening, the tamper contacts the gasket around the tamper to seal contents within the blending cavity.

19 Claims, 12 Drawing Sheets

(56) References Cited

U.S. PATENT DOCUMENTS

| | | | | |
|---|---|---|---|---|
| 2022/0240722 A1* | 8/2022 | Kim | A47J 43/0772 | |
| 2023/0165407 A1* | 6/2023 | O'Donoghue | B01F 31/85 | 366/120 |
| 2024/0090707 A1* | 3/2024 | Ahn | A47J 43/046 | |

OTHER PUBLICATIONS

"Blendtec Stealth Owner's Manual", Blendtec Stealth Owner's Manual, OWN-CD-085, Manual, Owners, Stealth Rev D Aug. 13., 2013.

"Introducing the All-new Stealth Nitro from Blendtec", Blendtec Official; https://www.youtube.com/watch?v=CKiugVVWzrl, Blendtec Official. (2020). Introducing the all-new Stealth Nitro from Blendtec [Video]. YouTube. https://www.youtube.com/watch?v=CKiugVVWzrl, May 13, 2020.

* cited by examiner

BLENDER ENCLOSURE

FIELD

The described examples relate generally to a blending apparatus. In particular examples, the disclosure relates to a blending enclosure for encompassing a blender jar.

BACKGROUND

Food processors and blending devices have long existed to prepare a variety of beverages, smoothies, shakes, etc. In particular, food processors and blending devices can break down ice, frozen fruit, and other ingredients (e.g., to achieve a particular consistency). However, currently available blending systems have difficulty blending certain combinations of contents that either stick to the blending vessel's walls or are too thick or viscous to blend—either of which can result in cavitation. When cavitation occurs, the partially blended ingredients remain suspended above and out of reach of the blending blades, which in turn slows the blending process. Cavitation can be alleviated by adding a tamper or twister to the blending system to agitate the contents to continue the blending process without the need to stop the blender. However, use of agitators can be a messy process. Specifically, upon use and withdrawal of an agitator, blending contents that have clung to the surface of the agitator commonly drip or spill onto nearby surfaces, including floors, and thus create a need for additional cleanup.

Blending also produces undesirable levels of noise. Such noise can hinder conversation or otherwise disrupt the ambience of the environment in which the blending device used. Therefore there is a need for an improved blending device that can reduce operational noise while also maintaining access to the blending device (e.g., to add ingredients or to use a tamper or twister to agitate blender contents and blend thicker, viscous or more course material). Also, there is a need for improved sanitation or cleanliness of using agitators with blending devices.

The subject matter claimed herein is not limited to examples that solve any disadvantages or that operate only in environments such as those described above. Rather, this background is only provided to illustrate one example technology area where some examples described herein may be practiced.

SUMMARY

An aspect of the present disclosure relates to a blending apparatus. In some examples, the blending apparatus includes: a blender jar defining a blending cavity; a lid positionable over the blender jar, the lid defining an opening into the blending cavity; a gasket positioned around a periphery of the opening in the lid; an enclosable sound dampener positionable around the blender jar and the lid, the enclosable sound dampener defining an access hole corresponding to the opening in the lid; and a tamper insertable through the access hole and the opening. In some examples, when the tamper is inserted through the access hole and the enclosable sound dampener is in a closed state, blending noise is reduced and at least partially contained within the enclosable sound dampener. Further, in some examples, when the tamper is inserted through the opening, the tamper contacts the gasket around the tamper to seal blending cavity contents within the blending cavity.

In these or other examples, the access hole is aligned with the opening such that while the enclosable sound dampener is in the closed state: content can be added into the blending cavity when the tamper is removed from the access hole and the opening; or the tamper can engage with at least one of the blender jar or the blending cavity through the access hole and the opening.

In some examples, the enclosable sound dampener includes: an open state in which the blender jar is insertable into and removable from the enclosable sound dampener; and the closed state in which insertion and removal of the blender jar is prevented. In certain examples, the enclosable sound dampener includes: a rear enclosure portion; and a front enclosure portion pivotably connected to the rear enclosure portion. In particular examples, the enclosable sound dampener comprises a base attachable to at least the rear enclosure portion. Further, in some examples, the enclosable sound dampener includes a handle.

In these or other examples, the gasket is pliable to allow angular manipulation of the tamper. In certain implementations, the gasket includes an interference fit relative to the tamper such that, during withdrawal of the tamper from the opening, the gasket scrapes the blending cavity contents off of a surface of the tamper. In some examples, the tamper includes a body portion with a uniform cross-section. In some examples, the lid includes vents for evacuating air in response to actuation of the tamper.

Another aspect of the present disclosure includes a blending apparatus that can include: a first enclosure portion; a second enclosure portion pivotably connected to the first enclosure portion, the first enclosure portion and the second enclosure portion defining an internal volume; a blender jar positionable within the internal volume; a mount positioned within the internal volume, the mount sized and shaped to receive the blender jar; and an access hole defined by the second enclosure portion, the access hole positioned above the mount when the second enclosure portion is closed shut against the first enclosure portion.

In some examples, the blender jar includes a lid with an opening, the opening being concentric with the access hole along a central axis when the second enclosure portion is closed shut against the first enclosure portion. In certain examples, the enclosure can include a first enclosure portion that is positionally fixed; and a second enclosure portion that is configured to lift open relative to the first enclosure portion to expose the internal volume. In some examples, the access hole is sized and shaped to receive at least one of a tamper or a removable cap. In at least some examples, the mount is sized and shaped to receive different blender jars.

In some examples, the present disclosure includes a blending apparatus, where the blending apparatus can include: a blender jar defining a blending cavity; a lid positionable over the blender jar to at least partially enclose the blending cavity, the lid defining an opening into the blending cavity; a sound enclosure encompassing the blender jar and the lid, the sound enclosure defining an access hole corresponding to the opening in the lid; and a removable cap positionable over the access hole.

In some examples, the sound enclosure can include a backing and clam-shell cover that together define an internal volume within the sound enclosure, the clam-shell cover configured to open and close relative to the backing. In particular examples, the blending apparatus can further include a tamper that, when positioned through the access hole and the opening, forms a seal. In certain implementations, the tamper includes a bellows connection to the sound enclosure. In some examples, the blending apparatus can further include: an agitator positionable within the blending cavity; and a coupler configured to rotatably couple the agitator and the removable cap.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
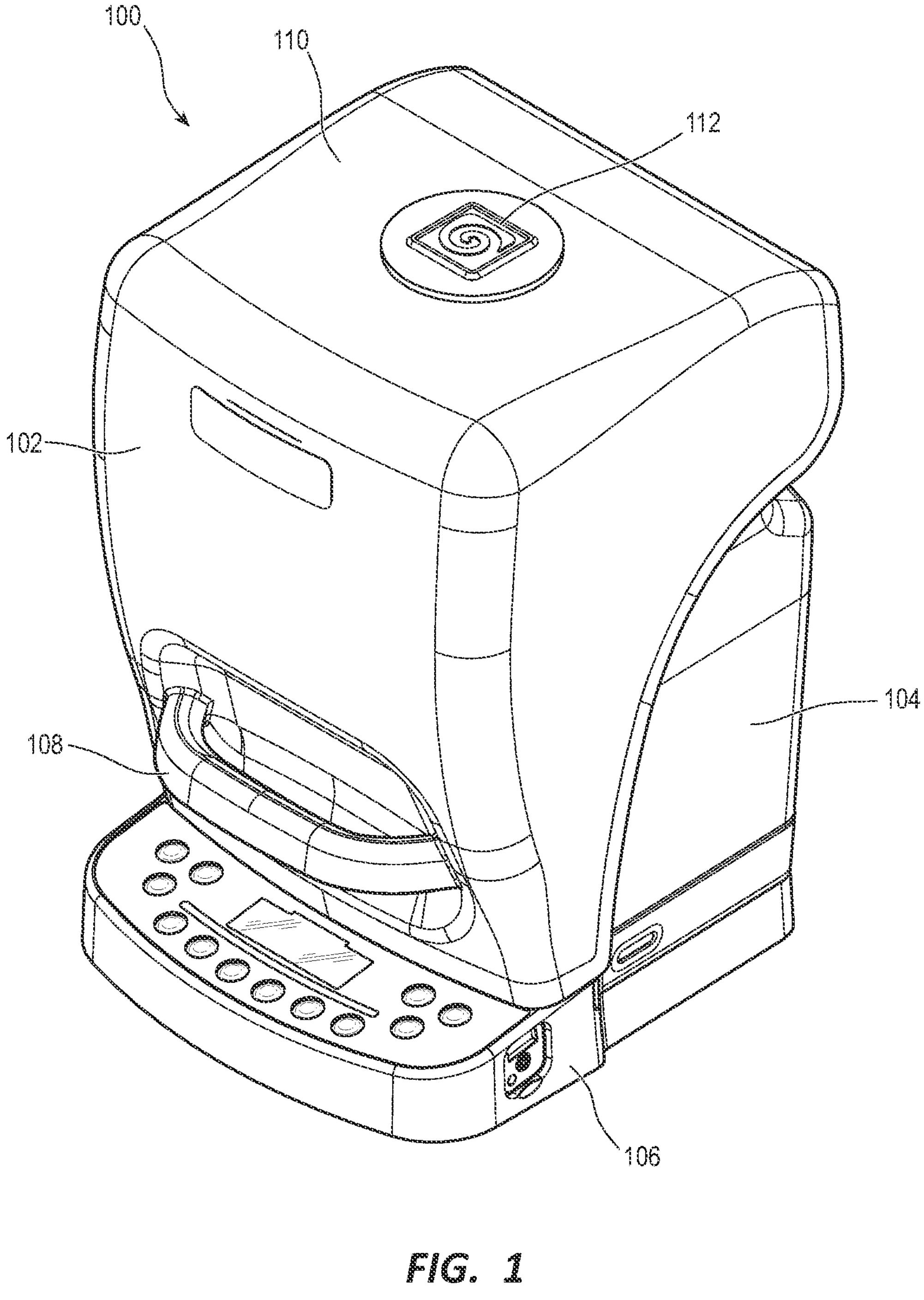
FIG. 1 illustrates a top front perspective view of an example enclosure.

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples as defined by the appended claims.

The following disclosure relates to a blending apparatus with a sound enclosure. In one example, the sound enclosure can include a noise-reducing box capable of mitigating blending noise. The sound enclosure can be sized and shaped to cover a blending device. For example, the sound enclosure can include one or more portions that open to receive a blending device. In turn, the one or more portions can close or "shut" to encompass the blending device within the sound enclosure.

In some examples, the sound enclosure can include a thru-hole-sized and shaped-to-receive removable cover. In certain implementations, the removable cover can be replaced with a tamper for inserting through the sound enclosure and into a blending device. The thru-hole can be positioned such that the tamper can be inserted through the sound enclosure and into the blending device when the sound enclosure is closed shut. In this configuration, the tamper can be manipulated during operation of the blending device when the sound enclosure is closed.

Further, in some examples, the tamper can provide one or more seals. As an example, the tamper can provide a sound seal at the thru-hole by plugging the thru-hole to prevent escaping noise. As another example, the tamper can provide a content seal. To illustrate, the tamper can engage (e.g., via a plug) a lid thru-hole of the blending device. More particularly, the tamper can engage a gasket corresponding to the lid thru-hole of the blending device. In certain implementations, this gasket can scrape clean the tamper as it is withdrawn from the lid thru-hole. The gasket-scraped tamper can reduce or eliminate undesired cleanup from using the tamper (e.g., little or few blending contents left wicked to the surface of the tamper).

Additional or alternative blending apparatuses can include tampers with a bellows connection to the sound enclosure. In another example, a blending apparatus includes a removable cap with a manual interface. For instance, the removable cap can be inserted into the thru-hole of the sound enclosure to engage a coupler and corresponding agitator. Such a removable cap can be manually twisted to engage the agitator. Thus, a variety of different configurations of sound enclosures, blender jars, and tampers/agitators are herein contemplated.

These and other examples are discussed below with reference to FIGS. 1-12. However, a person of ordinary skill in the art will readily appreciate that the detailed description given herein with respect to these FIGS. is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 2:
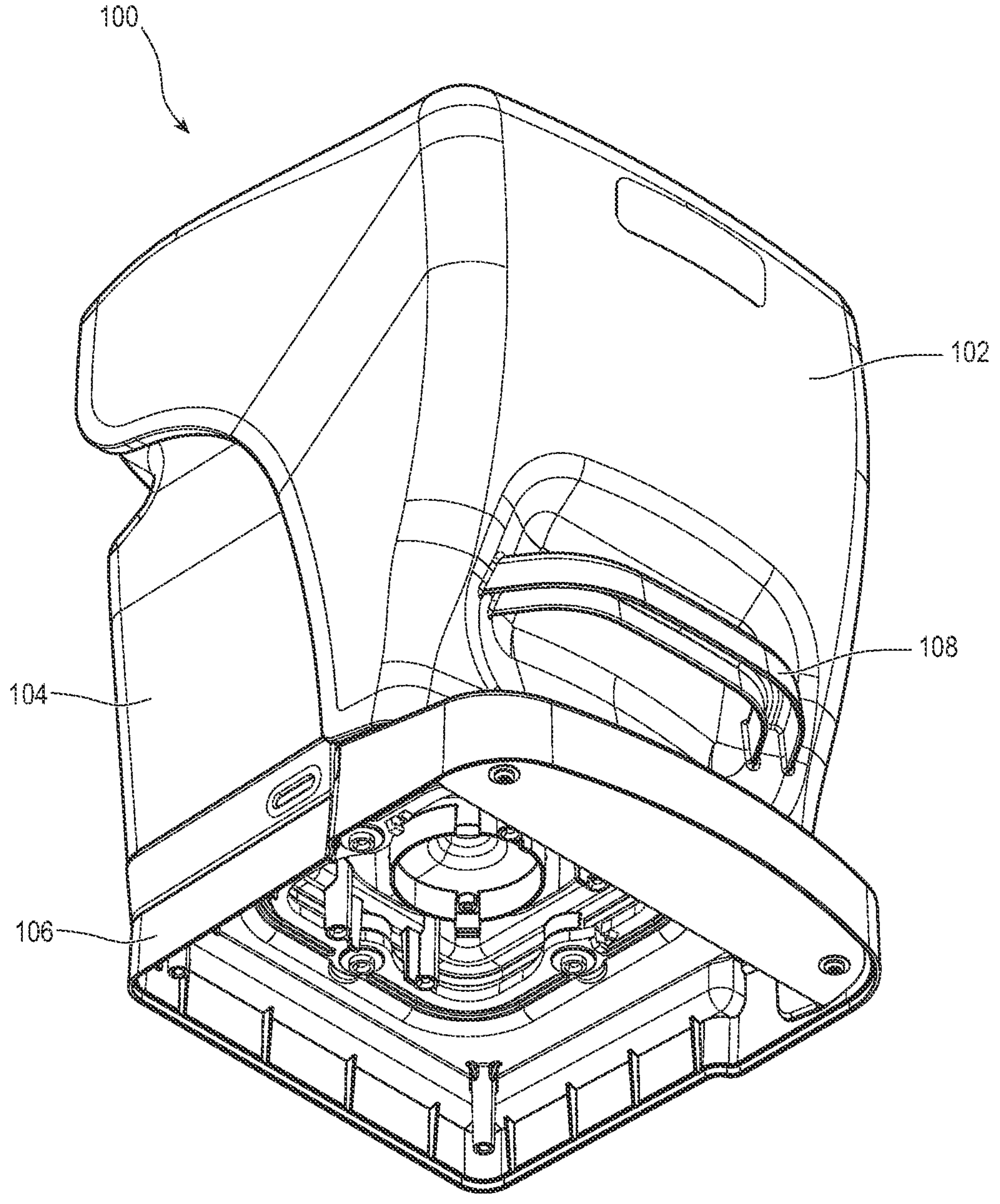
FIG. 2 illustrates a bottom front perspective view of an example enclosure.
Figure 3:
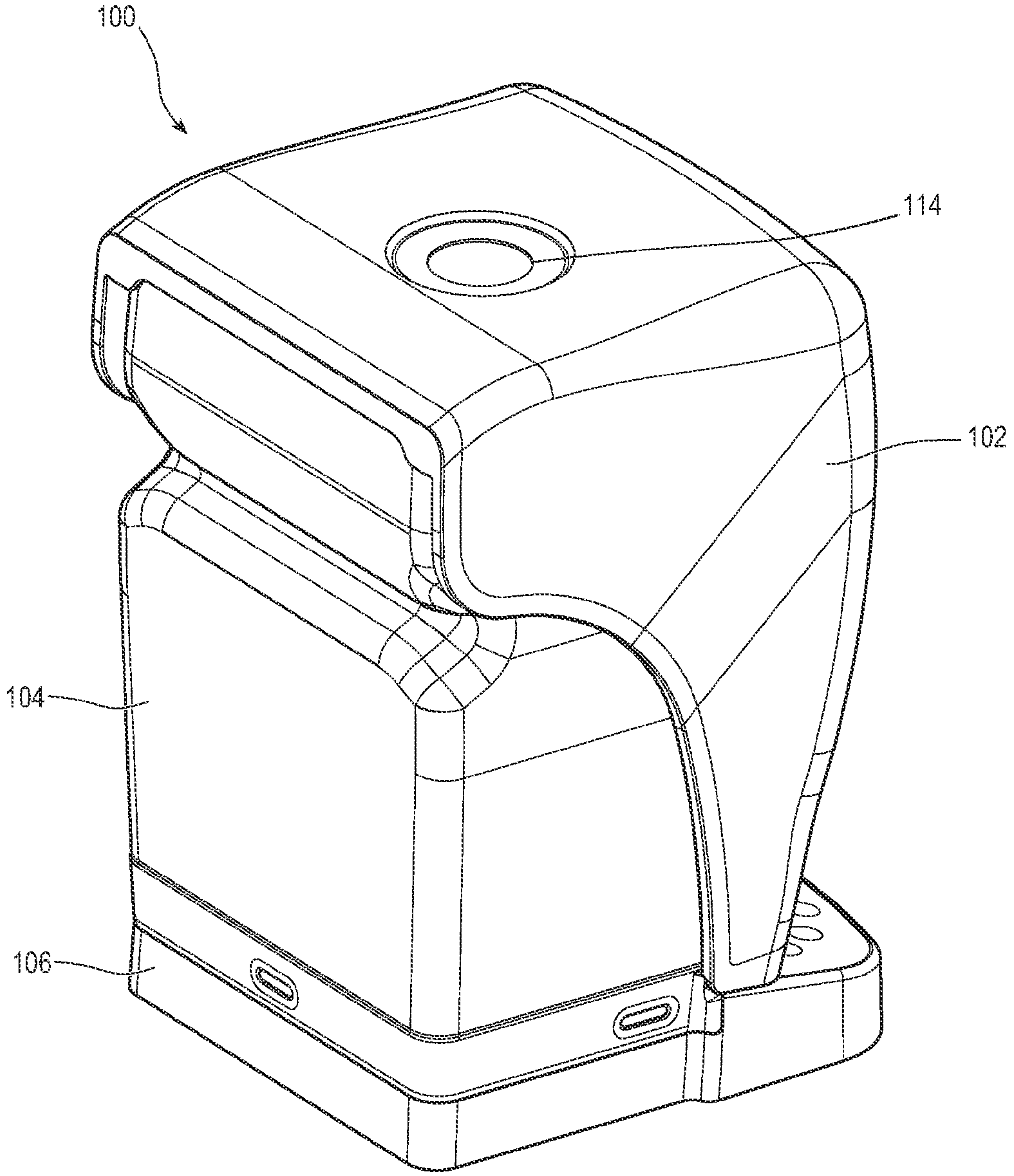
FIG. 3 illustrates a top rear perspective view of an example enclosure.

FIGS. 1-3 illustrate assembled views of an enclosable sound dampener or sound enclosure (hereafter "enclosure") 100. In particular, FIG. 1 illustrates a top front perspective view of the enclosure 100. FIG. 2 illustrates a bottom front perspective view of the enclosure 100, and FIG. 3 illustrates a top rear perspective view of the enclosure 100.

As shown, the enclosure 100 includes a front enclosure portion 102 and a rear enclosure portion 104. In these or other examples, the front enclosure portion 102 includes a clamshell cover or lid. For instance, the front enclosure portion 102 can open and close or "shut" in a clamshell fashion relative to the rear enclosure portion 104. By contrast, the rear enclosure portion 104 can remain positionally fixed relative to the front enclosure portion 102. In this regard, the rear enclosure portion 104 can include a backing, plate, housing surface, sleeve, etc. that remains in place while the front enclosure portion 102 can open and close.

As will be discussed below, the front enclosure portion 102 and the rear enclosure portion 104 together can define an internal volume within the enclosure 100. Moreover, the front enclosure portion 102 and the rear enclosure portion 104 can form a sound-attenuating enclosure.

As used herein, the term "sound-attenuating enclosure" refers to a housing that can reduce operational noise of a housed blender. For example, a sound-attenuating enclosure can decrease the amount of decibels detectable outside of the enclosure 100 during operation of a blender housed inside the internal volume of the enclosure 100. As another example, a sound-attenuating enclosure can actively generate noise-canceling signals (e.g., signals of certain frequencies and amplitude) that cancel out one or more frequencies of operational noise from a blender housed inside the internal volume of the enclosure 100.

In addition, the front enclosure portion 102 and the rear enclosure portion 104 can include a variety of materials. In some examples, at least one of the front enclosure portion 102 where the rear enclosure portion 104 can include a metal material, a plastic material, an elastomer material, a composite material, a foam material, etc. In at least one example, the front enclosure portion 102 and the rear enclosure portion 104 includes a combination of materials. For instance, at least one of the front enclosure portion 102 or the rear enclosure portion 104 includes an inner layer (e.g., a foam layer) and an outer layer (e.g., a plastic layer). In certain examples, the front enclosure portion 102 and the rear enclosure portion 104 can comprise the same material(s). In other examples, the front enclosure portion 102 and the rear enclosure portion 104 can comprise different materials, as may be desired.

Further shown, the front enclosure portion 102 includes a handle 108. The handle 108 can include a bar or other suitable hand grab. Additionally or alternatively, the handle 108 can include a grip, recess, protrusion, or other manual interface. Via the handle 108, a user can manipulate the front enclosure portion 102 between open and closed states (i.e., to lift open and shut the front enclosure portion 102).

The front enclosure portion 102 also includes a top portion 110 with a removable cap 112. In some examples, the removable cap 112 can include a cover or plug. Alternatively, the removable cap 112 can jut or extend outwardly to allow user manipulation (as with the twist-cap discussed below in relation to FIGS. 11-12). Moreover, as will be discussed in more detail below, the removable cap 112 can be removed as depicted in FIG. 3 to expose an access hole 114 into the internal volume of the enclosure 100. Through the access hole 114, content can be added into a blender jar positioned inside the internal volume of the enclosure 100. Additionally or alternatively, a tamper or agitator can be manipulated through the access hole 114.

The enclosure 100 can further include a base 106. In such examples, the base 106 is positioned below the front enclosure portion 102 and the rear enclosure portion 104. For instance, in some examples, the base 106 is attached to a bottom surface or portion of at least the rear enclosure portion 104. For example, the base 106 is removably attached to the rear enclosure portion 104 (e.g., via snap-fit, fasteners, etc.). As another example, the base 106 can be permanently attached to the rear enclosure portion 104. In certain implementations, the base 106 also mates with, abuts, or otherwise engages the front enclosure portion 102. The base 106 can also include a variety of electro-mechanical systems, user interfaces, etc. for operating a blender jar inside the enclosure 100. Additionally, as will be discussed below, the base 106 can mount or support a blender jar positioned inside the enclosure 100.

A person with ordinary skill in the art will appreciate that the enclosure 100 can include a variety of configurations and designs. For example, the enclosure 100 need not have a front enclosure portion and a rear enclosure portion as described above. Indeed, in an alternative example, the enclosure 100 can have a bottom enclosure portion and a top enclosure portion. In such a case, the top enclosure portion can separate entirely from the bottom enclosure portion (e.g., a separable lid), or else pivotably connect to the bottom enclosure portion. In another alternative example, the enclosure 100 can include a single enclosure unit that attaches to or rests upon the base 106. In yet another alternative example, the enclosure 100 can include a single enclosure unit with a movable door (e.g., a swing door, a sliding door, etc.) positioned within one or more sidewalls of the single enclosure unit.

Any of the features, components, and/or parts, including the arrangements and configurations thereof shown in FIGS. 1-3 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIGS. 1-3.

Figure 4:
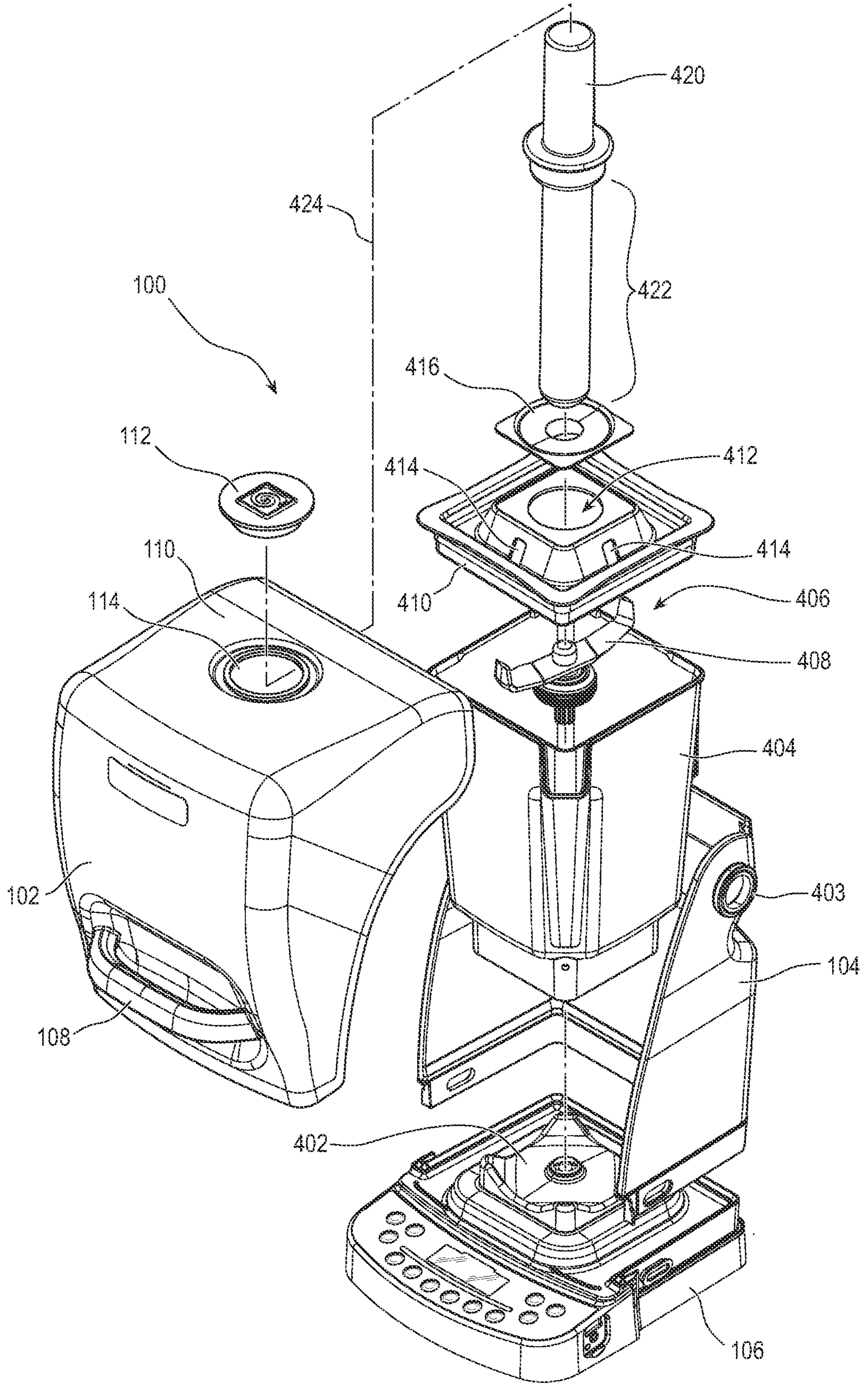
FIGS. 4-5 illustrate exploded views of an example blending apparatus.
Figure 5:
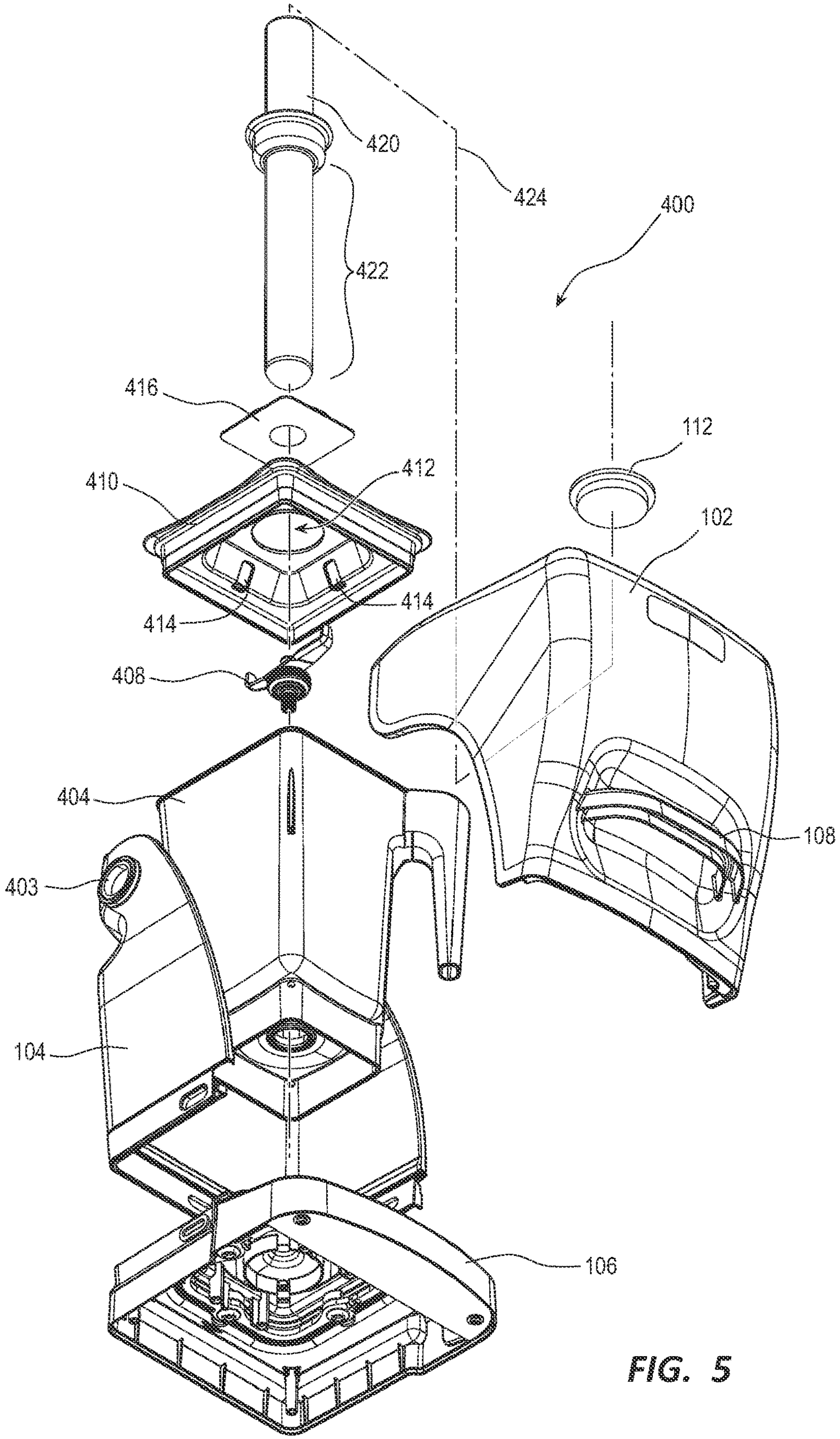

FIGS. 4-5 illustrate exploded views of a blending apparatus 400 in accordance with examples of the present disclosure. The blending apparatus 400 includes the enclosure 100 discussed above. In addition the blending apparatus 400 can include a blender jar and an agitator.

As shown, the base 106 can include a mount 402. The mount 402 is sized and shaped to receive a blender jar 404. In some examples, the mount 402 is sized and shaped to receive other blender jars (e.g., blender jars of different shapes, designs, capacity sizes, etc.). Those of ordinary skill in the art will appreciate that the mount 402 can include one or more components to drive rotation of blending blades 408 within a blending cavity 406 of the blender jar 404. For instance, the mount 402 can include a fluted socket sized and shaped to receive (and engage) a blender driveshaft rotatably coupled to the blending blades 408.

The rear enclosure portion 104 can include a socket 403. The socket 403 corresponds to pivot point at which the front enclosure portion 102 can rotate relative to the rear enclosure portion 104. In some examples, the socket 403 includes a recess or hole defined by an outer side surface of the rear enclosure portion 104. In such examples, the socket 403 can engage a protrusion, ball, arm, or other suitable joining piece positioned on an inner surface of the front enclosure portion 102. In alternative examples, the socket 403 is positioned on an inner side surface of the rear enclosure portion 104 to engage a corresponding mating piece on an outer side surface of the front enclosure portion 102. Thus, the front enclosure portion 102 and the rear enclosure portion 104 can rotatably mate in a variety of configurations.

In addition, the socket 403 may be a partial hole, as opposed to a thru-hole, so as to better contain sound within the internal volume of the enclosure 100. Further, in some examples, the socket 403 is positioned high and rearward within the rear enclosure portion 104 to provide improved access into the internal volume of the enclosure 100 when the front enclosure portion 102 is open. Such positioning can also provide increased clearance between the front enclosure portion 102 and at least one of the blender jar 404 or the rear enclosure portion 104.

A lid 410 is positionable over the blending jar 404 so as to cover the blending cavity 406 (where the blending blades 408 blend content). In this manner, contents within the blending cavity 406 can be maintained within the blending jar 404, particularly during blending. In addition, the lid 410 includes an opening 412. The opening 412 is sized and shaped to allow insertion of an agitator (e.g., a tamper) 420.

Furthermore, the lid 410 can include vents 414. The vents 414 include slits, thru-holes, slots, etc. defined by the lid 410. The vents 414 allow for air circulation into and/or out of the blending cavity 406. In particular, this breathability for air evacuation through the vents 414 can allow the lid 410 to maintain its position over the blending cavity 406, particularly during actuation (e.g., up/down plunging motions) of the tamper 420. In other words, the vents 414 can help reduce or eliminate a pressurization effect that can otherwise occur within the blending cavity 406 in response to plunging of the tamper 420—in turn causing the lid 410 to pop off the blender jar 404.

In these or other examples, the vents 414 can be oriented to mitigate or substantially eliminate undesired splashing through the vents 414. For instance, the vents 414 can include at least a partial vertical pitch (where the "vertical" direction corresponds to the up-down directions parallel or similar to the sidewalls of the blender jar 404).

In certain alternative examples, the blending apparatus 400 can include other arrangements for venting air through the blender jar 404 during actuation of the tamper 420. For instance, in addition to (or in the alternative) to the vents 414 in the lid 410, at least one of the gasket 416 or the tamper 420 can include vents similar to those described as the vents 414. To illustrate, the tamper 420 or the gasket 416 can define notches through which air can move. Thus, during actuation of the tamper 420, the blender jar 404 can effectively breathe (e.g., push air out or suck air in) through this alternative configuration of vents to maintain a positioning of the lid 410 over the blender jar 404.

Further, in some examples, the lid 410 can include a variety of different materials. In certain implementations, the lid 410 can comprise a metal, plastic, or elastomer material. In specific examples, the lid 410 is compatible with biological materials for consumption. In at least some examples, the lid 410 includes a non-porous surface, a non-stick surface or coating, etc. (e.g., for easy and convenient cleaning).

A gasket 416 is positionable around a periphery of the opening 412. In particular examples, the gasket 416 is at least partially supported by a top surface of the lid 410. In some cases, the gasket 416 partially overlaps or reduces the opening 412. In certain examples, the gasket 416 overlaps at least a majority of the opening 412 such that blending cavity contents are less prone to escape the blending cavity 406 when the tamper 420 is not present. In these or other examples, the gasket 416 is sized and shaped to engage a body portion 422 of the tamper 420. For instance, the gasket 416 includes an interference fit relative to the tamper 420. To illustrate, the gasket 416 includes an inner diameter less than the outer diameter of the body portion 422. In this manner, the gasket 416 can engage the tamper 420 to form a seal that maintains contents within the blending cavity 406. Furthermore, the gasket 416 can engage the tamper 420 during withdrawal of the tamper 420 from the opening 412. Specifically, the gasket 416 can scrape or squeegee blending cavity contents off a surface of the tamper 420 as the tamper 420 is withdrawn through the opening 412. This scraping or squeegee effect can clean the tamper 420 as it is withdrawn from the opening 412, thereby reducing or eliminating unwanted drips and messes from a dirty tamper after full withdrawal.

The gasket 416 can also include a variety of different materials. In particular examples, the gasket 416 can include a pliable material, such as an elastomer. Moreover, with a pliable material, the gasket 416 can bend or flex in response to manipulation (e.g., angular manipulation) of the tamper 420. For example, the gasket 416 can move with the tamper 420 as the body portion 422 moves at an angle (i.e., off-axis relative to a central axis 424). In this manner, the gasket 416 can allow the tamper 420 to engage (e.g., scrape) internal sidewalls of the blender jar 404. As another example, the gasket 416 can move with the tamper 420 as the body portion 422 mixes or stirs contents within the blending cavity 406. Such flexibility of the gasket 416 can provide an improved seal against the surface of the tamper 420.

Further, and as mentioned above, the gasket 416 can include one or more vents (albeit not shown). For example, the gasket 416 can define notches through which air can escape from (or enter into) the blending cavity 406 of the blender jar 404. Such air evacuation can positionally stabilize the lid 410 and/or the gasket 416 during actuation (e.g., plunging) of the tamper 420.

A person of ordinary skill in the art will appreciate, however, that the gasket 416 can additionally (or alternatively) include non-pliable material(s), such as metal. In such a case, the gasket 416 can include structural elements (e.g., inclined surfaces, chamfered edges, etc.) that allow movement of the tamper 420. Alternatively, in some examples, the gasket 416 can be omitted altogether in favor of such structural elements being included in the lid 410 (e.g., a flexible lid).

The front enclosure portion 102 can include the access hole 114, as mentioned above. Defined by a top surface of the front enclosure portion 102, the access hole 114 can be centrally located for easy and convenient access to the blender jar 404 when the front enclosure portion 102 is shut. Specifically, the access hole 114 can align with a central axis 424 oriented vertically through the opening 412, the blender jar 404, and the mount 402. In particular implementations, the access hole 114 is concentric with the opening 412 along the central axis 424, when viewed from above and when the front enclosure portion 102 is shut. In other implementations, however, the access hole 114 is not concentric with the opening 412. Rather, the access hole 114 and the opening 412 are vertically offset from each other (when viewed from above), yet are overlapping to still provide tamper access. For instance, one of the access hole 114 or the opening 412 is aligned with the central axis 424, but the other is not aligned with the central axis 424. Still, in other examples, neither of the access hole 114 or the opening 412 is aligned with the central axis 424.

In these or other examples, the access hole 114 can be positioned over the blender jar 404 (when present) and the mount 402. Moreover, this relative alignment between the access hole 114 and the opening 412 can provide access through both the enclosure 100 and the blender jar 404. In this manner, contents can be conveniently dropped through the access hole 114 and into the blending cavity 406 when the front enclosure portion 102 is closed (and the tamper 420 is withdrawn).

In addition, the aligned position of the access hole 114 relative to the opening 412 can provide the tamper 420 access into the blending cavity 406 (e.g., for pushing, stirring, or scraping contents). Accordingly, the access hole 114 can be sized and shaped to receive the tamper 420, particularly the body portion 422. Additionally, in some examples, the access hole 114 comprises sufficient lateral space to allow manipulation of the tamper 420 (e.g., angular manipulation or swivel motions). Further, an upper portion of the tamper 420 can form a seal (e.g., a sound seal) at the access hole 114. For example, as will be described below in relation to FIG. 9, the tamper 420 can include a lip that overhangs the access hole 114 and effectively plugs the access hole 114 to at least decrease the amount of operational blending noise that can escape through the access hole 114.

In some examples, the access hole 114 includes a pliable periphery (e.g., to allow movement or angular manipulation of the tamper 420 when inserted). Additionally or alternatively, the access hole 114 can include a pliable gasket (similar to the gasket 416) to provide a sound seal, while also providing the desired flexibility for the tamper 420.

The blending apparatus 400 further includes the tamper 420. As used herein, the term "tamper" refers to a particular type of agitator. For example, a tamper can include ramrod-like stick that can be used to safely manipulate blending cavity contents (e.g., by scraping blender jar sidewalls, mixing, stirring, etc.). In some examples, a tamper can include a hand-hold or grip, as well as a body portion (e.g., the body portion 422) for engaging a blender jar and/or its contents. In particular examples, a tamper can be used to tamp down on blending cavity contents. In so doing, a tamper can push blender cavity contents toward the blending blades 408 and help reduce or prevent cavitation.

The blending apparatus 400 is not limited to implementations with a tamper, however. Indeed, the blending apparatus 400 can include one or more different agitators (i.e., secondary agitators used in conjunction with the blending blades 408). As used herein, the term "agitator" refers to a variety of mixing devices. Accordingly, an agitator can modify or disrupt rotational flow of blender cavity contents. In some examples, an agitator can include a tamper. In other examples, an agitator can include a scraper (e.g., as described in U.S. Pat. No. 10,357,131, the contents of which are expressly incorporated herein by reference). An agitator can be manually integrated with the blending apparatus 400 (e.g., as described below in relation to FIGS. 11-12). Alternatively, an agitator can be automated (e.g., with a battery-powered motor) to whisk, stir, compress, pulverize, or scrape blender cavity contents.

Any of the features, components, and/or parts, including the arrangements and configurations thereof shown in FIGS. 4-5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4-5.

Figure 6:
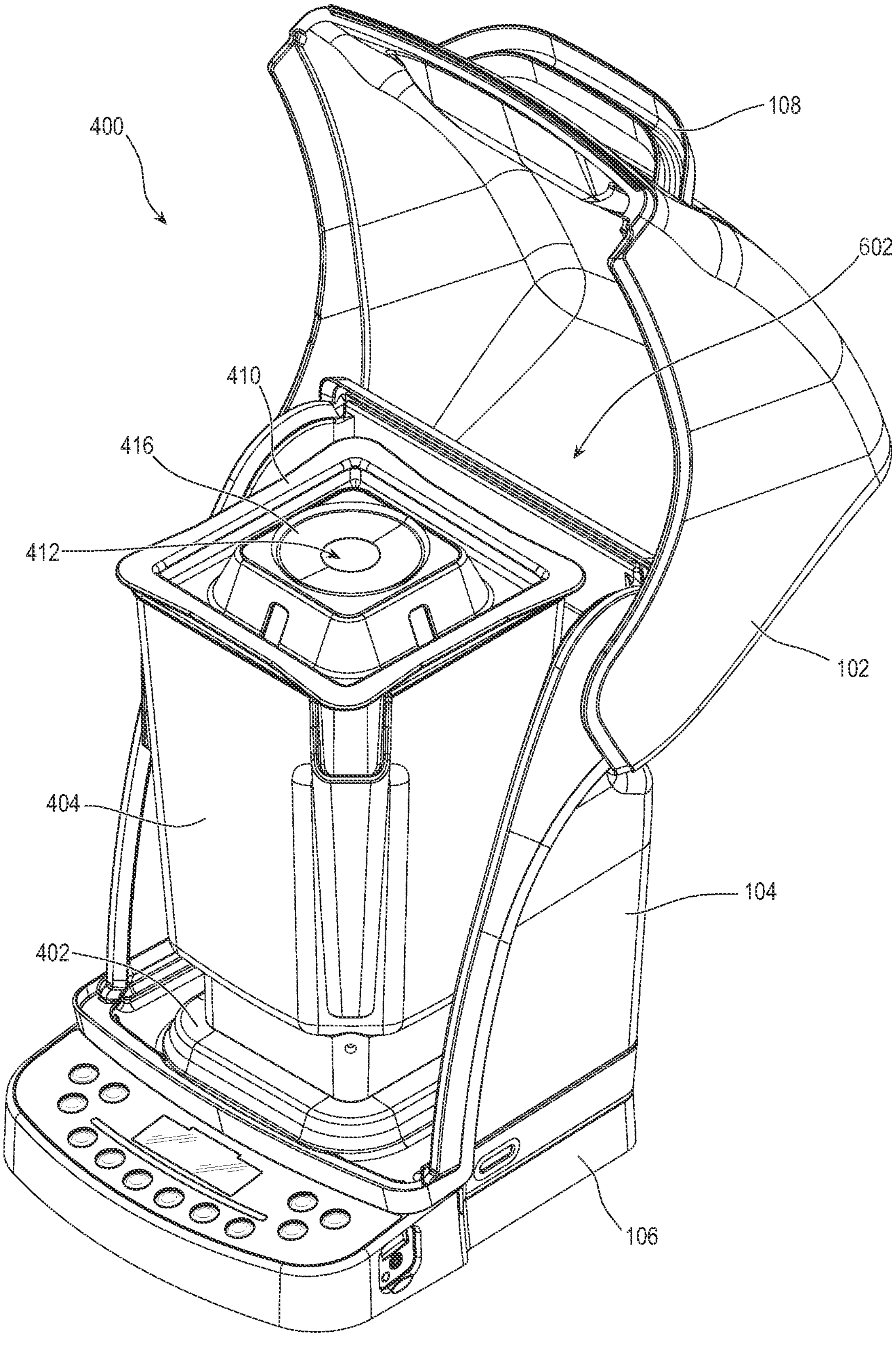
FIGS. 6-7 illustrate assembled views of an example blending apparatus.
Figure 7:
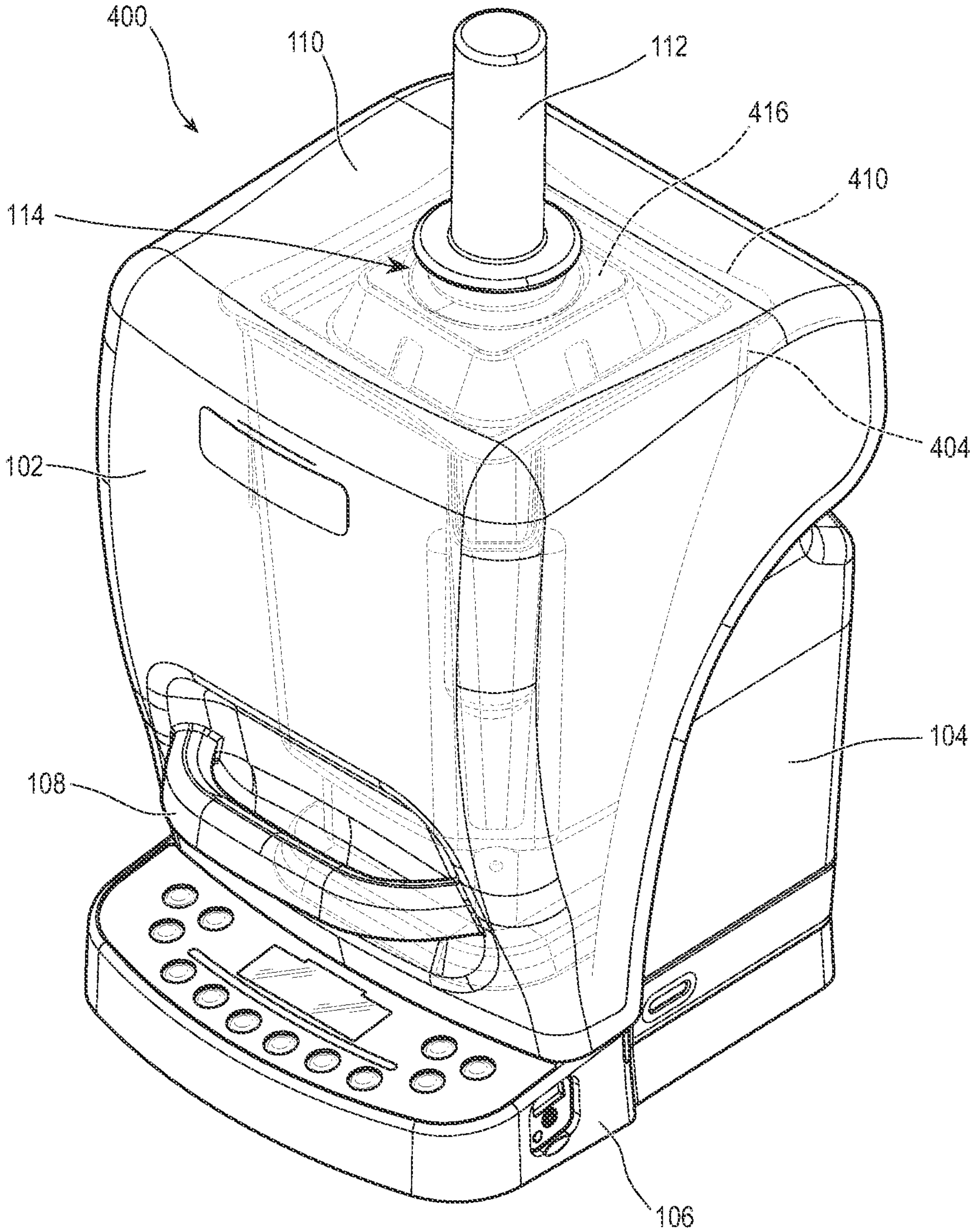

FIGS. 6-7 illustrate assembled views of the blending apparatus 400 in accordance with one or more examples of the present disclosure. In particular, FIG. 6 illustrates the blending apparatus 400 in an open state, and FIG. 7 illustrates the blending apparatus 400 in a closed state. The open and closed states of the blending apparatus 400 are thus discussed below, in turn.

As used herein, the term "open state" refers to an open positioning of the front enclosure portion 102. In an open state as shown in FIG. 6, an internal volume 602 within the enclosure 100 is accessible (e.g., for placing or removing the blender jar 404). Contents can be added to the blender jar 404 in an open state. In some cases, however, the blending apparatus 400 is operationally disengaged (i.e., no blending occurs) when the blending apparatus 400 is in the open state.

By contrast, the term "closed state" refers to a closed positioning of the front enclosure portion 102. For example, in a closed state as shown in FIG. 7, the front enclosure portion 102 engages (e.g., contacts, abuts with, rests upon, or locks to) the rear enclosure portion 104 to encompass or shut in the internal volume 602 within the enclosure 100. Therefore, in a closed state, the blender jar 404 cannot be placed inside or removed from the internal volume 602 within the enclosure 100. In some cases, the blender jar 404 is ready (or operable) for blending when the blending apparatus 400 is in the closed state. Moreover, in a closed state, operational blending noise is at least partially contained or sealed within the internal volume 602.

Additionally, FIG. 7 shows the tamper 420 positioned through the access hole 114. Indeed, the tamper 420 can engage the blender jar 404 through the access hole 114, despite the blending apparatus 400 being in the closed state. The engagement of particular portions of the tamper 420 relative to the access hole 114 and the opening 412 (not shown) are discussed further below in relation to FIGS. 8-9.

Any of the features, components, and/or parts, including the arrangements and configurations thereof shown in FIGS. 6-7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6-7.

Figure 8:
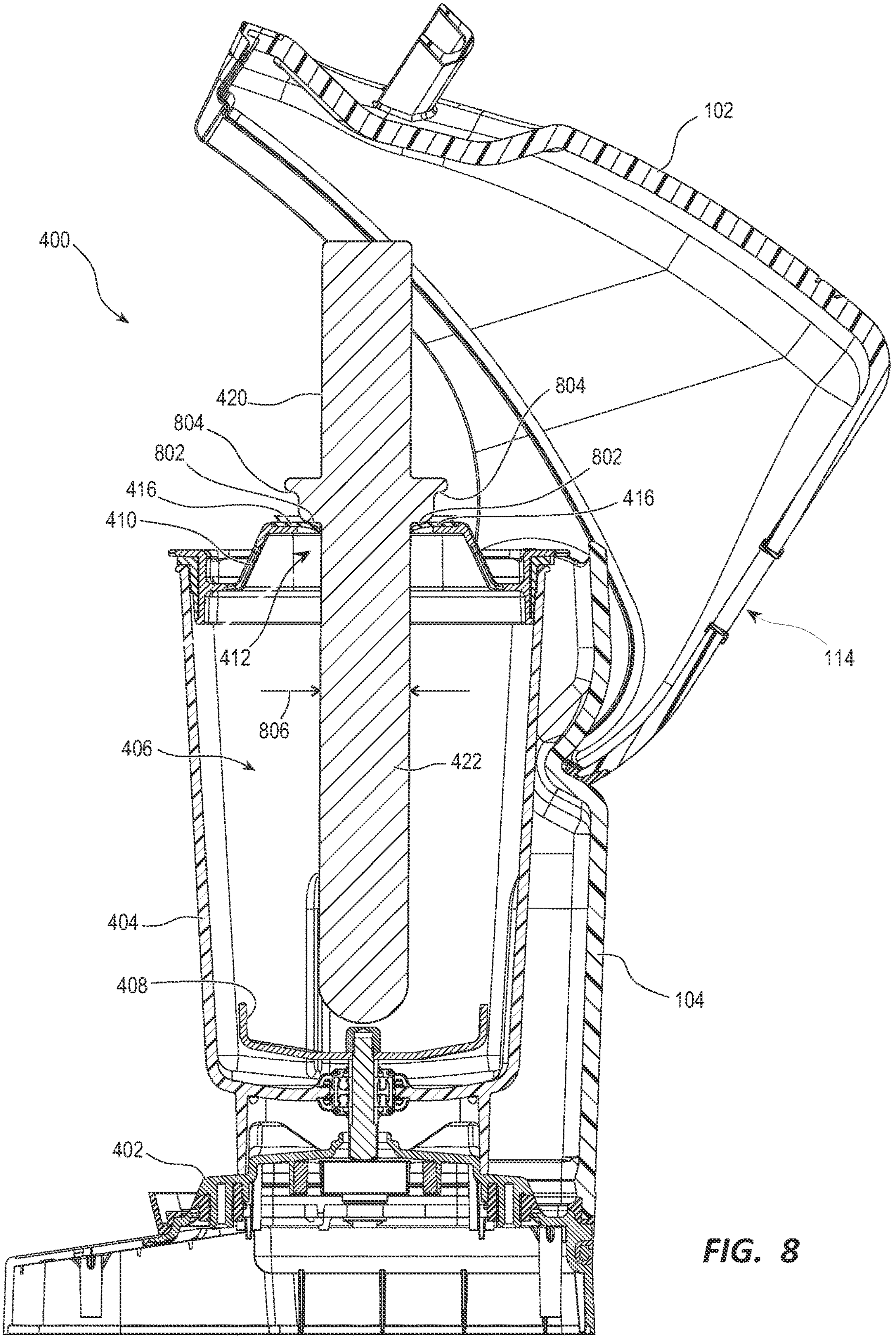
FIGS. 8-9 illustrate cross-sectional side views of an example blending apparatus.
Figure 9:
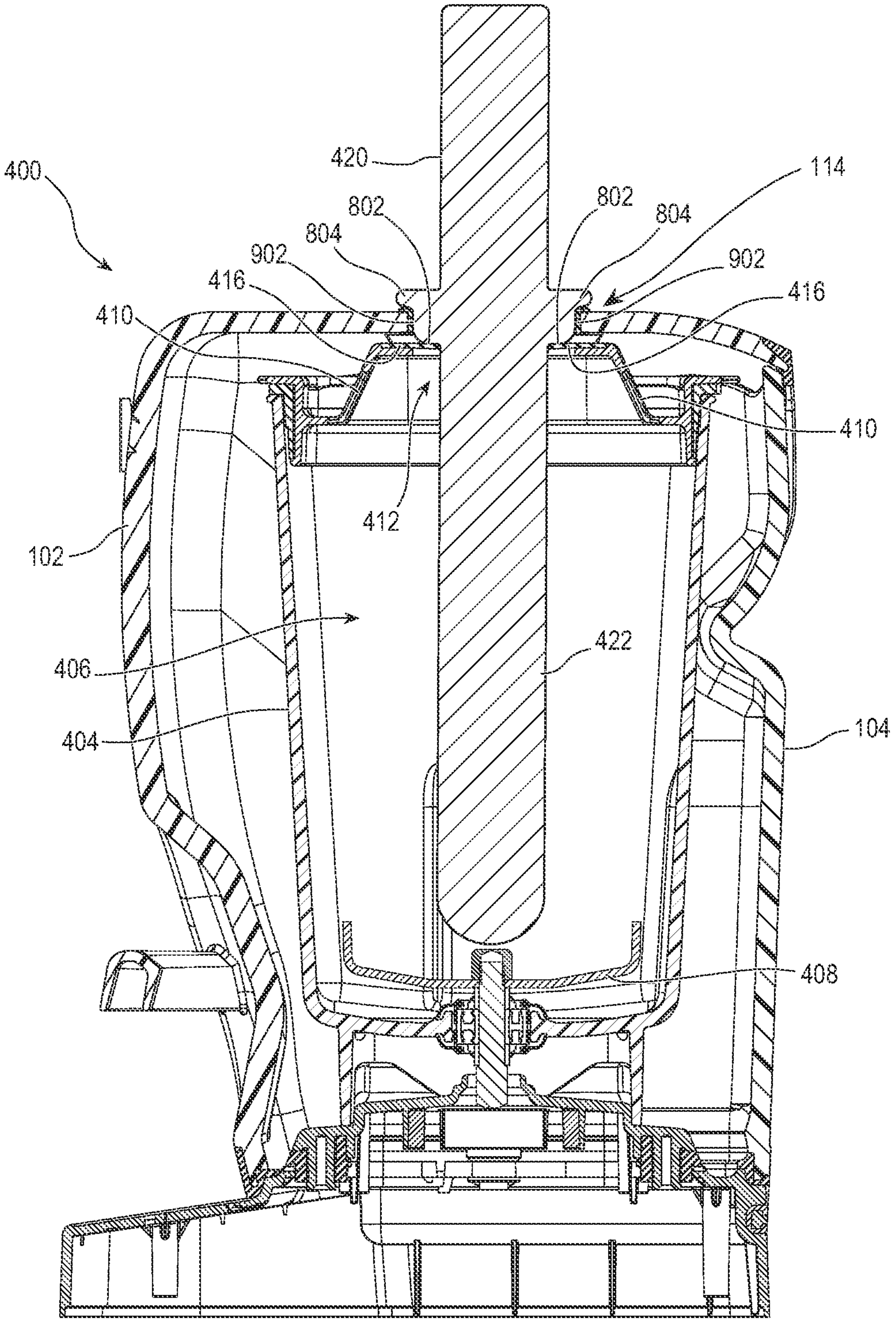

FIGS. 8-9 illustrate cross-sectional side views of the blending apparatus 400 in accordance with examples of the present disclosure. In particular, the FIG. 8 illustrates a cross-sectional side view of the blending apparatus 400 in an open state. By contrast, FIG. 9 illustrates a cross-sectional side view of the blending apparatus 400 in a closed state. In particular, FIG. 9 illustrates the tamper 420 inserted into the blender jar 404. In some cases, however, the tamper 420 is removed from the blender jar 404 in order for the front enclosure portion 102 to transition from the open state to the closed state. In other examples, the tamper 420 can be left inside the blender jar 404 (i.e., left inserted within the opening 412) when transitioning the front enclosure portion 102 from the open state to the closed state. As another example, the tamper 420 can be withdrawn from the blender jar 404 while the blending apparatus 400 is in the open state. In turn, the tamper 420 can be inserted into the access hole 114, after which the front enclosure portion 102 can be shut to the closed position. In this example, the tamper 420 has sufficient clearance and is otherwise aligned to pivot with the front enclosure portion 102 when transitioning to the closed state. In still other examples, the tamper 420 can be inserted into the access hole 114 after the front enclosure portion 102 has fully transitioned to the closed state.

As shown, the tamper 420 includes a shoulder 802. As used herein, the term "shoulder" refers to an enlarged portion of the tamper 420. A shoulder of the tamper 420 can jut or extend outwardly (e.g., perpendicularly) relative to the body portion 422. In some examples, a shoulder comprises a mechanical stop or surface abutment positioned at the top of the body portion 422 (e.g., to limit a depth of insertion of the tamper 420 into the blending cavity 406). Additionally or alternatively, a shoulder includes a sealing surface to help form a seal with the gasket 416.

In these or other examples, the shoulder 802 can contact, engage, interlock, etc. with the gasket 416. Additionally or alternatively, the shoulder 802 can contact, engage, interlock, or rest upon a top surface of the lid 410. In these or other examples, engagement of the shoulder 802 with at least one of the gasket 416 or the lid 410 can form a seal to enclose contents within the blending cavity 406. In particular, the shoulder 802 can contact and overlap a surface of the gasket 416 to disallow (or at least limit) blending cavity contents from escaping the blending cavity 406.

As used herein, the term "seal" refers to a type of joint between contacting components. In particular examples, a seal can limit, reduce, or substantially eliminate the passage of some element between components. In this regard, a seal can include a variety of different seals. For example, a seal can include a food/beverage seal, an air seal, a sound seal, etc. In some cases, a seal can include a partial seal. In other cases, a seal can include a complete seal (e.g., an impervious or impassable seal). In particular examples of the blending apparatus 400, the gasket 416 and the shoulder 802 can form a content seal to enclose blending cavity contents inside the blender jar 404.

Additionally, and as mentioned above, the gasket 416 can clean a surface of the tamper 420 as the tamper 420 is withdrawn from the opening 412. To facilitate this self-cleaning, the body portion 422 can include a uniform (e.g., constant, substantially constant, or near-constant) cross-section for at least a majority of the length (e.g., more than half the length) of the body portion 422. For example, the body portion 422 includes a uniform diameter 806 for at least a majority of the body portion 422. In certain implementations, the body portion 422 includes the uniform diameter 806 spanning from the shoulder 802 down towards an opposing end of the body portion 422 (excluding the rounded tip-end). In this manner, the gasket 416 can scrape (and therefore clean) a majority of the body portion 422 as the tamper 420 is withdrawn from the opening 412. Otherwise, a tapered diameter may allow tapered portions of the body portion 422 to pass through the opening 412 without contacting the gasket 416, thereby remaining unclean. Further, in at least some examples, the tamper 420 can include one or more sidewall notches (not shown) to allow air venting during actuation of the tamper 420 within the blending cavity 406.

In these or other examples, the tamper 420 (and other elements of the blending apparatus 400) can be manufactured utilizing a variety of techniques. In certain implementations, the tamper 420 is manufactured with injection molding methods. In such a case, molding material for the tamper 420 can be injected into a mold having little or no draft angle. For example, the mold can include a draft angle between 0 and 0.5 degrees for vertical surfaces. Additionally or alternatively, the mold can include undrafted walls (i.e., walls with zero draft angle) but can include proper tooling clearance for releasing the tamper 420 during the ejection process. Surface finishing, artifact removal, and other post-processing methods can also be employed, particularly for tampers manufactured with little or no draft angle in the molds.

Further, as shown in FIG. 9, a lip 804 of the tamper 420 can contact, engage, interlock, etc. with the periphery of the access hole 114. As used herein, the term "lip" refers to a surface feature of the tamper 420. For example, a lip of the tamper 420 can jut or extend outwardly (e.g., perpendicularly) relative to a tamper surface. In some examples, a lip comprises a mechanical stop or surface abutment positioned above the shoulder 802 (e.g., to limit a depth of insertion of the tamper 420 into the blending cavity 406). Additionally or alternatively, a lip is a sealing surface to help form a seal.

In particular examples, the lip 804 can form a sound seal or plug against the front enclosure portion 102. For instance, the lip 804 of the tamper 420 can contain, inside the internal volume 602, at least a portion of the blending noise from operation of the blender jar 404. In at least some examples, the lip 804 can contact or engage an optional gasket 902 formed around a periphery of the access hole 114 (e.g., to provide a flexible sound seal movable with the tamper 420).

Additionally or alternatively, the lip 804 of the tamper 420 can include a mechanical stop. For example, the lip 804 includes a rimmed protrusion jutting or extending even farther beyond the shoulder 802. In such examples, the lip 804 is sized greater than the access hole 114. Thus, the lip 804 can, as a mechanical stop, prevent the tamper 420 from falling all the way into the blending cavity 406, thereby interfering with the blending blades 408.

Any of the features, components, and/or parts, including the arrangements and configurations thereof shown in FIGS. 8-9 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 8-9.

The present disclosure is not limited to specific configurations (e.g., tamper configurations, enclosure configurations, etc.). The following section discusses some example alternative examples that fall within the scope of the present disclosure.

Figure 10:
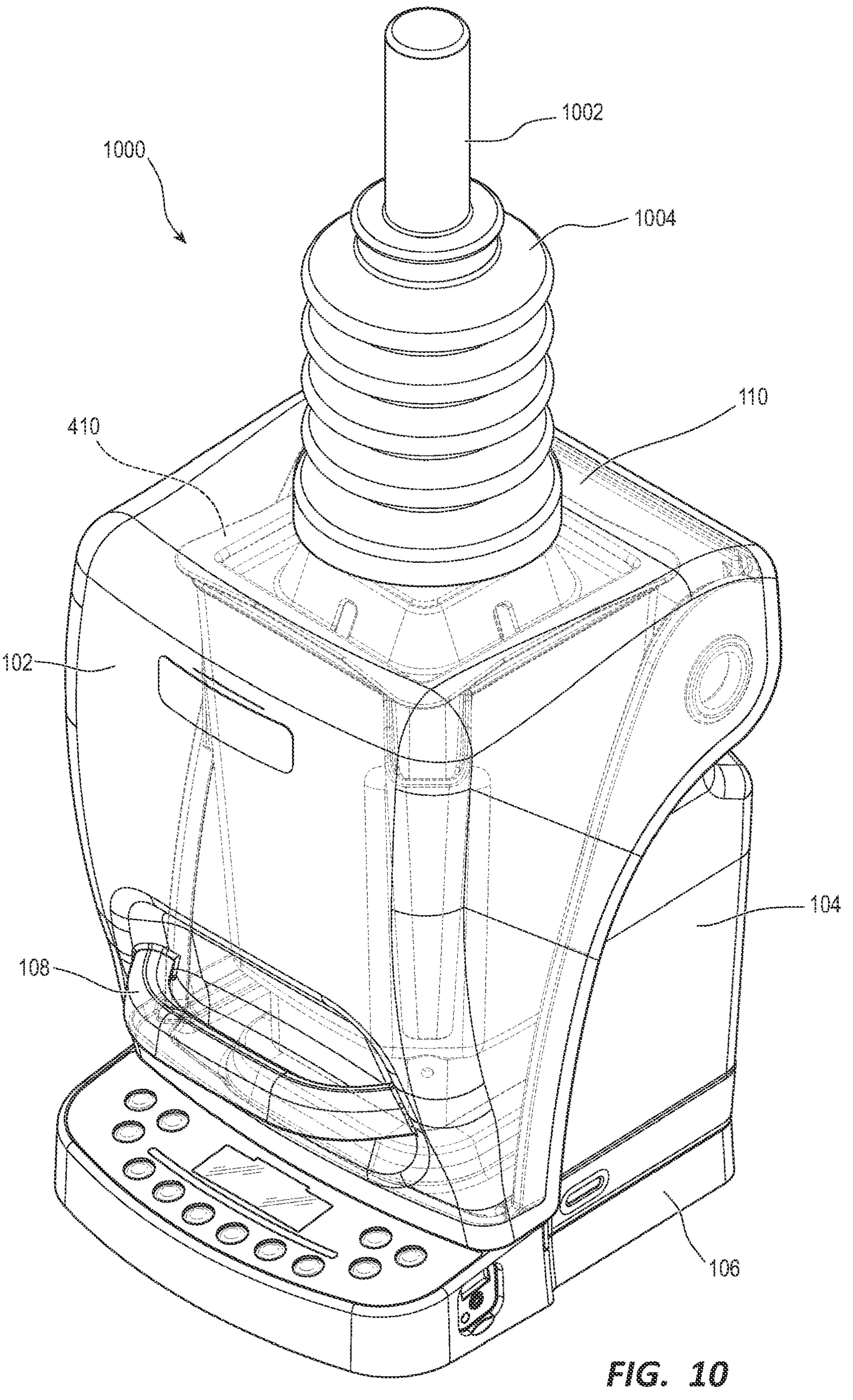
FIG. 10 illustrates a blending apparatus with a tamper and bellows connection.

FIG. 10 illustrates a blending apparatus 1000 in accordance with one or more examples of the present disclosure. As shown, the blending apparatus 1000 includes the same or similar enclosure, blender jar lid, and blender jar as discussed above. Differently however, the blending apparatus 1000 includes a tamper 1002 with a bellows connection 1004 that connects the tamper 1002 to at least one of the top portion 110 of the front enclosure portion 102 or the lid 410.

As used herein, the term "bellows connection" refers to an expandable or contractible connection. In particular examples, a bellows connection includes folds or creases that allow for volume expansion and contraction as portions of the bellows connection move.

In some examples, the bellows connection 1004 connects with the access hole 114 (not shown) to provide an example seal (e.g., a sound seal). In this manner, at least some operational noise of the under jar 404 can be contained within the internal volume of the blending apparatus 1000. Further, in some examples, bellows connection 1004 connects with the lid 410. Additionally or alternatively, the tamper 1002 engages the gasket 416 (not shown) in a same or similar manner described above for the tamper 420, thereby forming a blending cavity seal to help maintain blending cavity contents within the blender jar 404.

In some examples, the tamper 1002 can actuate or plunge up and down similar to the tamper 420 discussed above. In addition, the tamper 1002 can implement angular movements (e.g., to engage the blender jar 404) as also described above. In response to such movement, the bellows connection 1004 can fold or lengthen (i.e., compress or decompress) as the tamper 1002 correspondingly plunges up and down.

Any of the features, components, and/or parts, including the arrangements and configurations thereof shown in FIG. 10 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 10.

Figure 11:
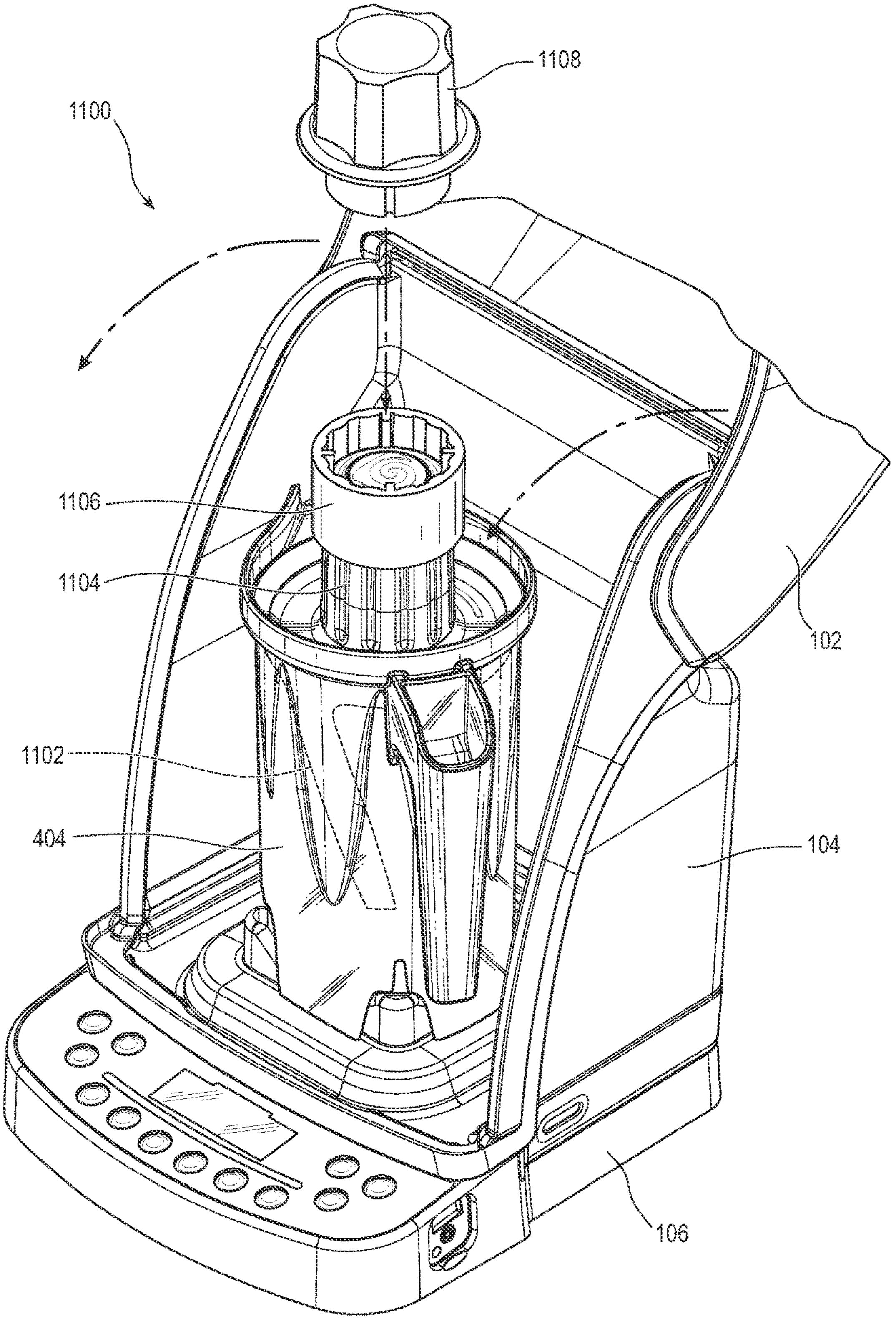
FIGS. 11-12 illustrate a blending apparatus with a twistable agitator.
Figure 12:
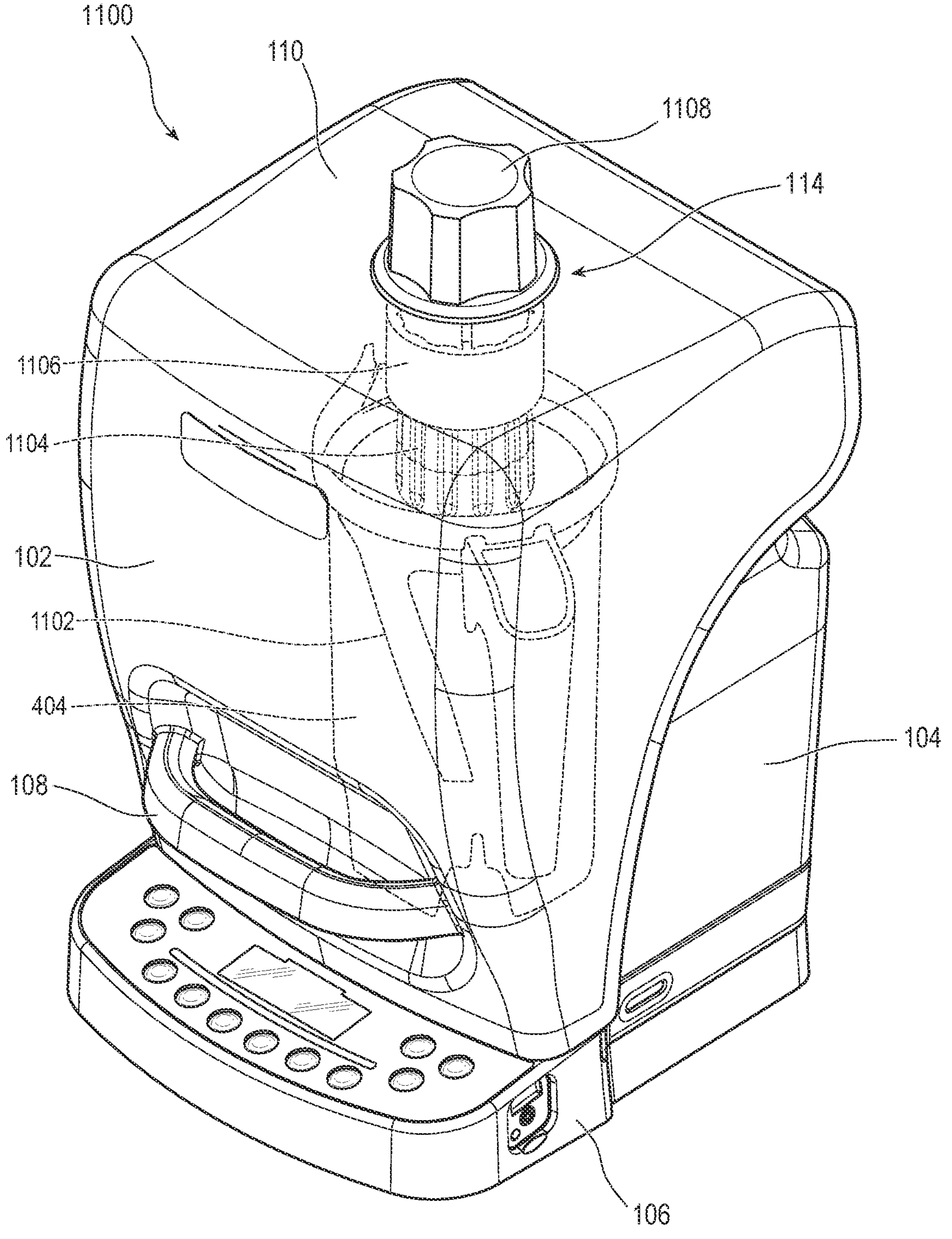

FIGS. 11-12 illustrate a blending apparatus 1100 in accordance with one or more examples of the present disclosure. In FIG. 11, the blending apparatus 1100 is in the open state, while in FIG. 12, the blending apparatus 1100 is in the closed state.

As shown, the blending apparatus 1100 includes some of the same or similar elements described above, including the front enclosure portion 102, the rear enclosure portion 104, the base 106, and the blender jar 404 (in this case, a rounded blender jar). Differently however, the blending apparatus 1100 includes an agitator 1102. The agitator 1102, as a secondary agitator in addition to blending blades, is positioned inside the blender jar 404 (e.g., to mix, scrape sidewalls, or otherwise disrupt fluid flow).

In these or other examples, the agitator 1102 can be actuated in a variety of ways. In some examples, the agitator 1102 is actuated via the lid 1104. For instance, when the front enclosure portion 102 is in the open state, the lid 1104 can be manually twisted to correspondingly rotate the agitator 1102 for scraping the sidewalls of the blender jar 404.

By contrast, when the front enclosure portion 102 is in the closed state, the lid 1104 can be indirectly twisted from outside the internal volume via a removable cap 1108 and a corresponding coupler 1106.

In some examples, the removable cap 1108 can include a hand-movable cap or cover. In some examples, a removable cap is twistable (e.g., a twist-cap). Additionally or alternatively, a removable cap can one or more of a variety of interfaces (e.g., a snap-fit cap, a threadably engaged cap, etc.). In certain implementations, a removable cap includes a knob, handle, lever, or other manual feature.

Further, in some examples, the removable cap 1108 can form a sound seal with the access hole 114, as similarly described above for the tamper 420. For example, the removable cap 1108 can plug the access hole 114, thereby reducing a level of operational noise that can escape the blending apparatus 1100. In certain implementations, the removable cap 1108 can engage the coupler 1106 (e.g., threadably engage) such that the removable cap 1108 compresses against the top portion 110 of the front enclosure portion 102 and/or a periphery of the access hole 114.

Additionally, as used herein, the term "coupler" refers to a connection piece that can couple two discrete components. For example, a coupler can rotatably couple components to rotate as a single unit. As another example, a coupler can couple components to translate as a single unit. Additionally or alternatively, a coupler can include a linkage (e.g., where the linked components can move at the same or different speeds). A person of ordinary skill in the art will appreciate that a coupler can have the same or different end portions for mating with other components, including threaded ends, snap-fit ends, interlocking ends, press-fit ends, geared ends, etc.

In such examples, the coupler 1106 is positioned inside the internal volume of the blending apparatus 1100 and can engage the lid 1104. In turn, the coupler 1106 can engage a portion of the removable cap 1108 extending through the access hole 114 (not shown) from outside the internal volume of the blending apparatus 1100. Thus, during operation of the blender jar 404, the removable cap 1108 can be rotated to correspondingly rotate the coupler 1106, the lid 1104, and the agitator 1102. In this manner, the agitator 1102 can be manually actuated when the front enclosure portion 1102 is in the closed state.

Any of the features, components, and/or parts, including the arrangements and configurations thereof shown in FIGS. 11-12 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 11-12.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not target to be exhaustive or to limit the examples to the precise forms disclosed.

It will be apparent to one of ordinary skill in the art that many modifications and variations are possible in view of the above teachings. Indeed, various inventions have been described herein with reference to certain specific aspects and examples. However, they will be recognized by those skilled in the art that many variations are possible without departing from the scope and spirit of the inventions disclosed herein. Specifically, those inventions set forth in the claims below are intended to cover all variations and modifications of the inventions disclosed without departing from the spirit of the inventions. The terms "including" or "includes" as used in the specification shall have the same meaning as the term "comprising."

What is claimed is:

1. A blending apparatus, comprising:
- a blender jar defining a blending cavity;
- a lid positionable over the blender jar, the lid defining an opening into the blending cavity;
- a gasket positioned around a periphery of the opening in the lid;
- an enclosable sound dampener positionable around the blender jar and the lid, the enclosable sound dampener defining an access hole through a top surface, and the access hole corresponding to the opening in the lid; and
- a tamper simultaneously disposed inside both of the access hole and the opening during operation of the blending apparatus, the tamper comprising:
  - a tamper handle at a proximal end of the tamper;
  - a body portion opposite the tamper handle and extending to a distal end of the tamper;
  - a shoulder protrusion above the lid and sealingly engaged with the lid at the gasket; and
  - a lip protrusion positioned proximal to the shoulder protrusion between the shoulder protrusion and the tamper handle, the lip protrusion above the top surface and sealingly engaged with the top surface of the enclosable sound dampener around the access hole above the lid.

2. The blending apparatus of claim 1, wherein the access hole is aligned with the opening such that while the enclosable sound dampener is in a closed state:
- content can be added into the blending cavity when the tamper is removed from the access hole and the opening; or
- the tamper can engage with at least one of the blender jar or the blending cavity through the access hole and the opening.

3. The blending apparatus of claim 1, wherein the enclosable sound dampener comprises:
- an open state in which the blender jar is insertable into and removable from the enclosable sound dampener; and
- a closed state in which insertion and removal of the blender jar is prevented.

4. The blending apparatus of claim 1, wherein the enclosable sound dampener comprises:
- a rear enclosure portion; and
- a front enclosure portion pivotably connected to the rear enclosure portion.

5. The blending apparatus of claim 4, wherein the enclosable sound dampener comprises a base attachable to at least the rear enclosure portion.

6. The blending apparatus of claim 1, wherein:

the protrusion comprises a lip diameter and the shoulder protrusion comprises a shoulder diameter less than the lip diameter, the shoulder diameter configured to pass through the access hole.

7. The blending apparatus of claim 1, wherein the lip protrusion defines an upper mechanical stop for the tamper and the shoulder protrusion defines a lower mechanical stop for the tamper.

8. The blending apparatus of claim 1, wherein the gasket comprises an interference fit relative to the tamper such that, during withdrawal of the tamper from the opening, the gasket scrapes the blending cavity contents off of a surface of the tamper.

9. The blending apparatus of claim 1 wherein the tamper comprises a body portion with a uniform cross-section.

10. The blending apparatus of claim 1, wherein the lid comprises vents for evacuating air in response to actuation of the tamper.

11. A blending apparatus, comprising:

a tamper comprising an upper mechanical stop and a lower mechanical stop;

a first enclosure portion;

a second enclosure portion pivotably connected to the first enclosure portion, the first enclosure portion and the second enclosure portion defining an internal volume;

a blender jar comprising a lid beneath the lower mechanical stop of the tamper and interfacing the lower mechanical stop of the tamper, the blender jar positioned within the internal volume;

a mount positioned within the internal volume, the mount being sized and shaped to receive the blender jar; and an access hole defined by the second enclosure portion, the access hole comprising a pliable periphery beneath the upper mechanical stop of the tamper and interfacing the upper mechanical stop of the tamper, and the access hole being positioned above the mount when the second enclosure portion is closed shut against the first enclosure portion.

12. The blending apparatus of claim 11, wherein the opening is concentric with the access hole along a central axis when the second enclosure portion is closed shut against the first enclosure portion.

13. The blending apparatus of claim 11, wherein the pliable periphery is sized and shaped to form a sound seal with the tamper.

14. The blending apparatus of claim 11, wherein:

the first enclosure portion is positionally fixed; and the second enclosure portion is configured to lift open relative to the first enclosure portion to expose the internal volume.

15. The blending apparatus of claim 11, wherein the mount is sized and shaped to receive different blender jars.

16. A blending apparatus, comprising:

a blender jar defining a blending cavity;

a rotatable lid positionable over the blender jar to at least partially enclose the blending cavity, the rotatable lid comprising an agitator disposed inside the blending cavity;

a sound enclosure encompassing the blender jar and the rotatable lid;

an access hole through a top surface of the sound enclosure;

a removable cap positionable over the access hole, wherein:

the removable cap is a manual twist cap sealingly engaged with the top surface of the sound enclosure, the manual twist cap comprising a lower portion disposed through the access hole; and a coupler comprising a first end and a second end opposite the first end, the first end being engaged with the rotatable lid and the second end being engaged with the lower portion of the manual twist cap;

wherein the first end of the coupler comprises a first toothed engagement with the rotatable lid, and the second end of the coupler comprises a second toothed engagement with the lower portion of the manual twist cap.

17. The blending apparatus of claim 16, wherein the sound enclosure comprises a backing and clam-shell cover that together define an internal volume within the sound enclosure, the clam-shell cover configured to open and close relative to the backing.

18. The blending apparatus of claim 16, wherein during operation of the blender apparatus, the manual twist cap is manually rotatable to correspondingly rotate the coupler and the rotatable lid to agitate blending contents within the blending cavity.

19. The blending apparatus of claim 16, wherein the lower portion of the manual twist cap comprises one or more slots to receive one or more toothed protrusions of the first end of the coupler.

* * * * *